United States Patent
Chang et al.

(10) Patent No.: US 8,627,909 B2
(45) Date of Patent: Jan. 14, 2014

(54) WALKING-ASSISTANT DEVICE

(75) Inventors: Yoon Young Chang, Seoul (KR); Byeong Rim Jo, Seoul (KR); Juhn Ho Park, Seoul (KR); Byungju Dan, Seoul (KR); Hong Gul Jun, Seoul (KR); Byunghoon Min, Seoul (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 13/114,763

(22) Filed: May 24, 2011

(65) Prior Publication Data

US 2012/0018233 A1    Jan. 26, 2012

(30) Foreign Application Priority Data

Jul. 20, 2010  (KR) .................. 10-2010-0069962
Oct. 29, 2010  (KR) .................. 10-2010-0106684

(51) Int. Cl.
*A61H 3/04*   (2006.01)
*A61G 5/04*   (2013.01)
*A61G 5/06*   (2006.01)
*A61G 5/14*   (2006.01)

(52) U.S. Cl.
CPC .. *A61H 3/04* (2013.01); *A61G 5/04* (2013.01); *A61G 5/06* (2013.01); *B60G 2400/256* (2013.01); *B60G 2400/823* (2013.01)
USPC ......... 180/19.2; 180/19.3; 280/47.34; 135/67

(58) Field of Classification Search
USPC ............ 280/47.11, 47.34, 5.517, 5.518, 5.28; 180/19.1, 19.2, 19.3; 135/67, 85; 482/66–68

See application file for complete search history.

(56) References Cited

U.S. PATENT DOCUMENTS

| | | | |
|---|---|---|---|
| 3,165,314 A * | 1/1965 | Clearman et al. | 482/68 |
| 3,438,641 A * | 4/1969 | Bradley | 280/5.28 |
| 3,872,945 A * | 3/1975 | Hickman et al. | 180/65.6 |
| 5,020,560 A * | 6/1991 | Turbeville | 135/67 |
| 5,168,947 A * | 12/1992 | Rodenborn | 180/19.1 |
| 6,409,186 B2 * | 6/2002 | Bennington | 280/43.23 |
| 6,763,292 B1 * | 7/2004 | Smith et al. | 701/37 |
| 7,111,856 B1 * | 9/2006 | Graham | 280/87.021 |
| 7,866,677 B1 * | 1/2011 | Rothstein et al. | 280/47.34 |
| D654,833 S * | 2/2012 | Pettersson et al. | D12/133 |
| 2009/0212671 A1* | 8/2009 | Clark et al. | 312/209 |
| 2010/0042292 A1* | 2/2010 | Schindler et al. | 701/37 |

FOREIGN PATENT DOCUMENTS

JP   04071554 A * 3/1992 ............ A61H 3/04

* cited by examiner

*Primary Examiner* — Paul N Dickson
*Assistant Examiner* — Wesley Potter
(74) *Attorney, Agent, or Firm* — Birch, Stewart, Kolasch & Birch, LLP

(57) ABSTRACT

A walking-assistant device is provided comprising a driving unit that includes four wheels and four actuators for adjusting heights of the four wheels, a mechanism unit that includes two vertical frames whose length is adjusted and connection frames for fixing and connecting the vertical frames, and a manipulation unit that includes a plurality of sensors for grasping a user's moving intention and controls the driving unit and the mechanism unit based on a signal detected by the sensors.

13 Claims, 10 Drawing Sheets

WALKING-ASSISTANT DEVICE

This nonprovisional application claims priority under 35 U.S.C. §119(a) on Patent Applications No. 10-2010-0069962 and 10-2010-0106684 filed in Republic of Korea on Jul. 20, 2010 and Oct. 29, 2010 the entire contents of which are hereby incorporated by reference.

BACKGROUND

1. Field

The exemplary embodiments of this document are directed to a walking-assistant device for an elderly or disabled person.

2. Related Art

A sharp increase in the population of elderly people due to extended average lifespan all over the world prompted entry into an aging society. Along with some European countries as well as Japan that have already entered the aging society, Korea and the U.S.A are also anticipated to experience such a social change soon.

As the society becomes aged, the number of disabled people suffering from bodily paralysis or elderly people having difficulty in walking due to poor muscular strength is drastically on the rise. Accordingly, considerable attention is being directed at moving-related technologies, such as, for example, technologies of effectively and safely supporting walking or sitting and standing of an elderly person.

Many of the developed countries have already started with development of technologies relating to supporting elderly people's daily activities (for example, walking support or sitting-and-standing support). As an example, some Japanese companies, such as Honda, Panasonic, Sony, Hitachi, etc., have been intensively in progress with research of the relating technologies. In Europe, German companies, such as Fraunhofer or Siemens, pay attention to such technologies.

Subsequently to Honda that commercialized walking-assistant devices back in 2008, Panasonic launched "Robot bed" in 2009 while planning to sell auxiliary suits using artificial muscle through its subsidiary, Activelink. In addition, Myomo which is an orthotic device, and HAL have been commercially available since 2007 and 2008, respectively.

However, the above-mentioned products suffer from a poor technological completion and low reliability in light of safety and lightness with a provision of only a narrow range of support.

Walking-assistant devices are generally heavy and burdensome in use, and thus used only for moving a short distance in a house or going to the bathroom. With such a walking-assistant device, one cannot go upstairs or walk beyond a bank, which may be possible with a cane.

In particular, a motor-type mobile platform which achieves driving and orientation using an electrical motor is too heavy and bulky, and even inconvenient in power feeding, and is thus being far away from customer's interest.

Furthermore, since such a motor-type mobile device is activated with a user's moving intention, the user is required to express his/her moving intention with the minimum operation while the device needs to exactly grasp the user's moving intention.

SUMMARY

One object of this document is to provide a walking-assistant device that is lightweight with a high efficiency in light of using space, as assisting muscular strength and supporting daily activities of an elderly or disabled person, such as walking, sitting, or standing, together with a control device that may exactly grasp a user's moving intention to effectively control the walking-assistant device.

According to an embodiment of this document, there is provided a walking-assistant device comprising a driving unit including four wheels and four actuators for adjusting heights of the four wheels, a mechanism unit including two vertical frames whose length is adjusted and connection frames for fixing and connecting the vertical frames, and a manipulation unit for including a plurality of sensors for grasping a user's moving intention and for controlling the driving unit and the mechanism unit based on a signal detected by the sensors, wherein the four wheels of the driving unit are connected to the mechanism unit through two left leg frames and two right leg frames that are hinge-connected to the mechanism unit through pivot shafts, and wherein two front wheels of the four wheels are activated by motors for rotation and connected to respective corresponding leg frames through shafts having steering motors for adjusting directions, and two rear wheels of the four wheels are connected to respective corresponding leg frames through steering shafts to move in all directions within a predetermined range.

According to an embodiment, the actuators may be hinge-connected to respective corresponding leg frames and the mechanism unit.

According to an embodiment, the walking-assistant device may further comprise a link assembly for changing a horizontal angle of the manipulation unit or an angle between the front leg frames and the rear leg frames by changing lengths of the actuators.

According to an embodiment, front actuators of the actuators may be connected to the link assembly and the connection frames, rear actuators may be connected to the link assembly and respective corresponding leg frames, and the link assembly may be connected to a corresponding front leg frame.

According to an embodiment, the link assembly may include first, second, and third links, wherein a first portion of the first link may be connected to the front actuators and a second portion of the first link is connected to the mechanism unit through the pivot shaft, wherein the second link may be connected to the rear actuators and corresponding rear leg frames, and the third link may be connected to corresponding front leg frames, and wherein the second and third links may be connected to a sliding member that is guided by a guiding member provided at a central portion of the first link.

According to an embodiment, the walking-assistant device may further comprise a sensor that detects an obstacle in a travelling direction.

According to an embodiment, upon grasping a user's intention to sit (or stand) through signals from the plurality of sensors, the manipulation unit may control the vertical frames to decrease (or increase) a height of an arm stand against which the user leans and control the actuators to increase (or decrease) an angle between the front leg frames and the rear leg frames while the height of the arm stand decreases (or increases).

According to an embodiment, the manipulation unit may control the motors moving the front wheels while the height of the arm stand decreases to stop the front wheels from rotating.

According to an embodiment, the manipulation unit may control the actuators so that the arm stand tilts forward while the height of the arm stand decreases or increases.

According to an embodiment, the manipulation unit may comprises an upper frame on which a user rests his arms, a lower frame under the upper frame, and the plurality of sensors between the upper and lower frames, wherein each of the sensors includes a lower fixing member attached to the lower frame, a plurality of compression sensing members attached to a surface of the lower fixing member, a plurality of rubber members contacting the respective compression sensing members, a vertical rubber member movable in response to a user's movement to transfer the user's force to the compression sensing members, and a upper fixing member attached to the upper frame to be connected to the vertical rubber member.

According to an embodiment, the sensors may respectively include fixing frame to fixing the rubber members.

According to an embodiment, the sensors may be attached on an inner surface or an outer surface of the lower fixing member.

According to an embodiment, the sensors may respectively include outer rubber members that are attached to a surface of the upper frame under the upper frame to move in response to the user's movement and in contact with the compression sensing members attached on the outer surface of the lower fixing member.

According to an embodiment, a space having a predetermined distance or a spring having a predetermined length may be disposed between a corresponding compression sensing members and a corresponding rubber member.

According to an embodiment, the compression sensing members each may produce a signal based on a compression force exerted from a contact with a corresponding rubber member.

According to the embodiments of this document, the walking-assistant device allows a user to stably move with his upper body maintaining a constant posture and height irrespective of external environments, such as inclined roads, road statuses, or banks. Further, the walking-assistant device creates a torque appropriate for the user's walking intention and the state of a road for the user to smoothly take a walk. The user may stand or sit with a stable posture without sliding down. Further, the user may take a sitting/standing motion without a separate manipulation.

The walking-assistant device includes sensors commonly used, thus saving manufacturing costs. Further, the use of compact sensors enables the walking-assistant device to be made smaller. The quick-response sensors with a less probability of malfunction allow the walking-assistant device to correctly judge user's moving intention.

BRIEF DESCRIPTION OF THE DRAWINGS

The implementation of this document will be described in detail with reference to the following drawings in which like numerals refer to like elements.

DETAILED DESCRIPTION

Hereinafter, exemplary embodiments of this document will be described in further detail with reference to the accompanying drawings.

For a user to perform a sitting/standing motion using a walking-assistant device, the height of an arm stand on which the user rests his arms to support needs to be adjusted. And, the height of the arm stand ought to maintain parallelism for the user to walk on an inclined ground using the walking-assistant device.

The walking-assistant device may include three or more wheels to roll the walking-assistant device. In the case of a walking-assistant device with three wheels, two of the wheels are positioned under the arm stand with the other one at a front and central portion, and in the case of a walking-assistant device with four wheels, a pair of two wheels are respectively positioned at both sides, so that the user may move his legs while seating his arms on the arm stand.

The wheels are required to be adjusted in height independently from each other to allow the height of the arm stand to remain parallel so that the user may walk on an inclined ground. In the case of a level or inclined ground with a constant slope, three wheels are sufficient for the walking-assistant device to keep the height of the arm stand level. However, in the case of a ground with a irregular surface, such as, for example, a ground having a hubble, it is difficult to independently adjust the three wheels to maintain parallelism in the height of the arm stand.

That is, a walking-assistant device having four wheels each wheel or each of two pairs of wheels being independently adjusted from the others is advantageous for better operation on an inclined ground or a ground having a hubble while adjusting the height of the arm stand.

Further, the walking-assistant device needs to be able to control the orientation (travelling direction) and/or go-and-stop of the wheels to prevent the wheels of the walking-assistant device from sliding or rolling down on an inclined ground due to the user's weight.

Figure 1:
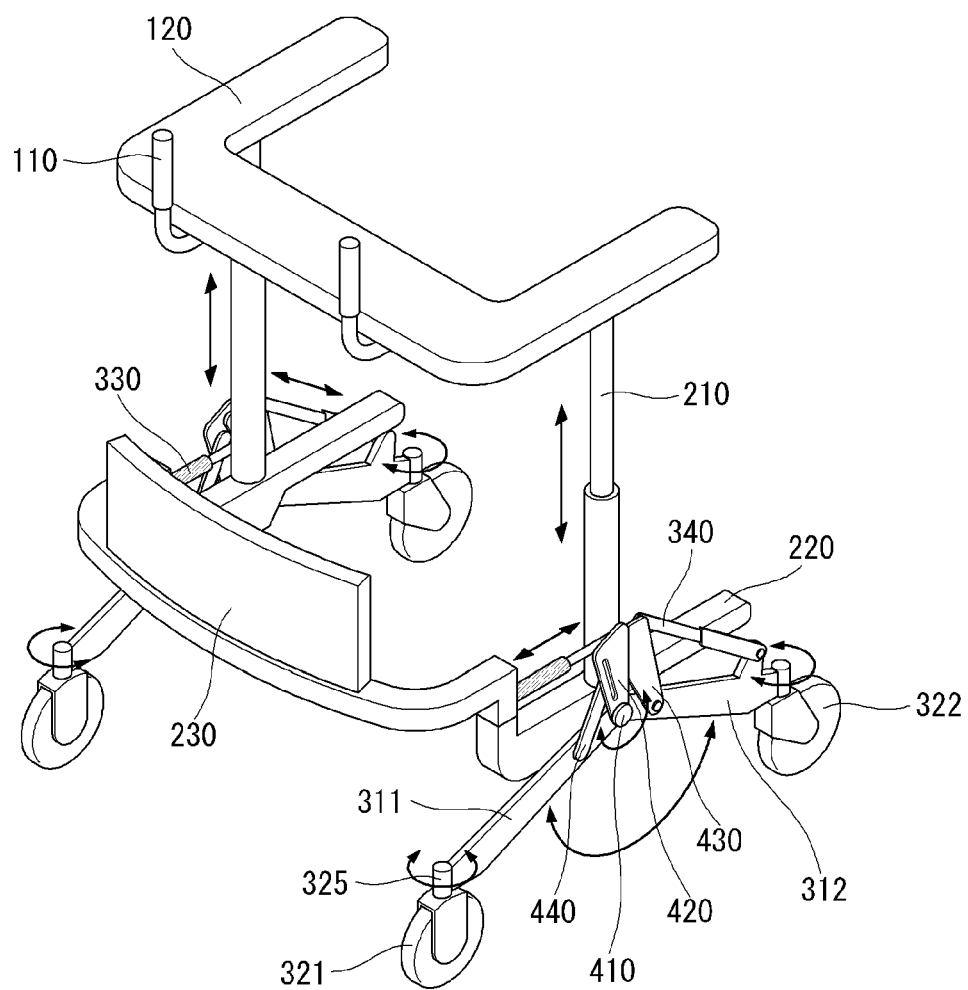
FIG. 1 is a perspective view illustrating a walking-assistant device according to an embodiment of this document.

FIG. 1 is a perspective view illustrating a walking-assistant device according to an embodiment of this document. The walking-assistant device has a bilateral symmetrical shape with respect to a travelling direction.

The walking-assistant device includes a manipulation unit 100, a mechanism unit 200, and a driving unit 300. The manipulation unit 100 grasps a user's moving intention and allows the user to lean against. The mechanism unit 200 supports the manipulation unit 100 and adjusts the height of the manipulation unit 100. The driving unit 300 assists the user safe walk.

The manipulation unit 100 is positioned at a top portion of the walking-assistant device so that the user may manipulate a travelling direction or speed or may lean against the manipulation unit 100. The manipulation unit 100 includes two handles 110 which the user gripes and a U-shaped arm stand 120 on which the user rests his lower arms. The handles 110 are each formed to have a cylindrical shape for the user to easily grip. The handles 110 are attached to a front side of the arm stand 120.

A plurality of sensors, for example, 6 axial FT (Force/Torque) sensors, are provided on or under a surface of each of portions of the U-shaped arm stand 120 on which the user's respective arms are seated, to detect a force and/or torque exerted by the user's arms. By doing so, the walking-assistant device may grasp the user's desired operations, such as, for example, moving forward, halting, accelerating, decelerating, sitting, standing, or rotating.

The manipulation unit 100 includes a processor or a controller that grasps a user's intended operation based on a signal detected by the sensors provided in the arm stand 120 and produces a driving signal to control an actuator or motor so that the user may maintain a posture appropriate for the grasped operation or sequentially change his postures. This will be described in further detail below with reference to FIG. 6.

The mechanism unit 200 corresponds to a body that connects the manipulation unit 100 with the driving unit 300 to support the walking-assistant device. The mechanism unit 200 includes vertical frames 210, connection frames 220, and a front support 230.

Each of the vertical frames 210 each includes two frames that support the manipulation unit 100 and adjust the height of the manipulation unit 100. The two frames include an upper vertical frame 211 connected to the manipulation unit 100 and a lower vertical frame 212 connected to the driving unit 300. The upper vertical frame 211 and the lower vertical frame 212 are slidingly connected to each other so that the length of the vertical frame 210 may be adjusted depending on a connection state between the upper vertical frame 211 and the lower vertical frame 212.

Accordingly, the user may adjust the height of the walking-assistant device to fit for his height by adjusting the length of the vertical frame 210.

The connection frames 220 each includes a plurality of frames vertically connected to the vertical frame 210 to support or fix the lower vertical frames 212 or to connect the lower vertical frames 212 to each other.

The connection frame 220 includes upper and lower connection frames that are respectively shaped as a reversed "L" and an "L" as viewed from a side of the walking-assistant device. The upper connection frames are connected to front actuators 330 of the driver 300, and the lower connection frames are connected to the vertical frames 210.

The front support 230 is positioned between the connection frames 220 at a front side of the connection frames 220 to connect the connection frames to each other. For example, the front support 230 may connect the connection frames to each other so that the connection frames are not spread from each other by an external force.

For example, the user's personal stuff or something needed for the walking-assistant device, such as a battery for a power feed to the walking-assistant device, may be placed on the front support 230. According to an embodiment, the front support 230 may include a seat which is bent down so that the user may be seated on the seat.

The driving unit 300 moves the walking-assistant device. The driving unit 300 includes a leg frame 310, a wheel unit 320, front actuators 330, and rear actuators 340. The wheel unit 320 includes two front wheels 321 and two rear wheels 322. The leg frame 310 includes two front leg frames 311 and two rear leg frames 312 that connect the wheels 321 and 322 to the mechanism unit 200. The two front leg frames 311 connect the front wheels 321 to the mechanism unit 200, and the two rear leg frames 312 connect the rear wheels 322 to the mechanism unit 200.

The four leg frames 311 and 312 are hinge-coupled with the connection frames 220 or the lower vertical frames 212 of the mechanism unit 200 through hinge units 400 including pivot shafts 410 so that the leg frames 311 and 312 may be pivoted by a predetermined angle (for example, an angle less than 90 degrees). The left or right two leg frames 311 and 312 are respectively connected to the same pivot shafts.

The driving unit 300 includes two front actuators 330 and two rear actuators 340 to independently adjust the position and height of the four wheels 321 and 322. First portions of the four actuators 330 and 340 are connected to the respective corresponding leg frames 311 and 312, and second portions of the four actuators 330 and 340 are connected to the mechanism unit 200. According to an embodiment, the four actuators 330 and 340 each may be hinge-connected to any other member to be able to pivot in at least one direction.

Figure 2:
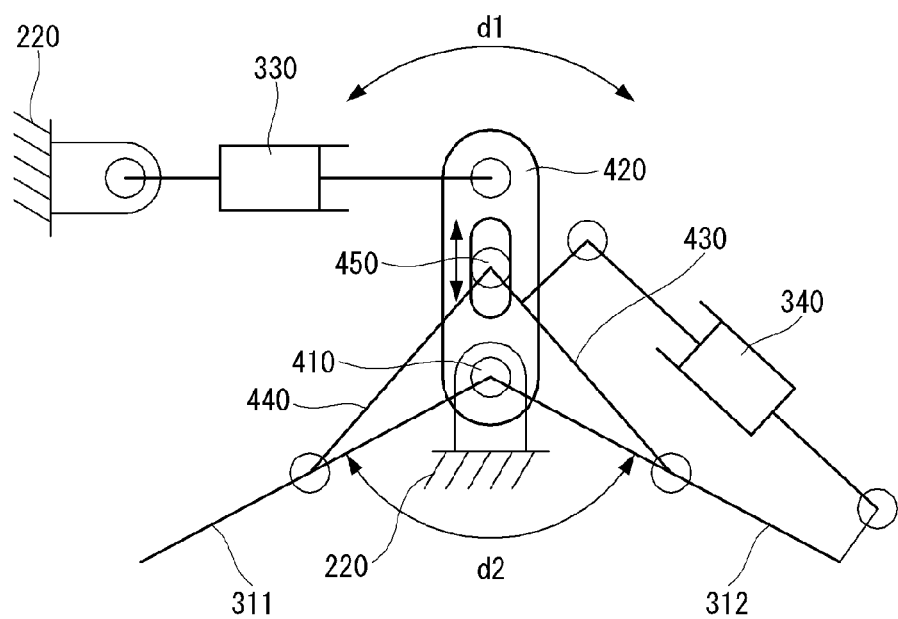
FIG. 2 is a conceptual view illustrating a hinge structure where leg members and actuators are coupled to each other.

Instead, according to an embodiment, the first portions of the four actuators 330 and 340 may be connected to the rear leg frames 312 or the mechanism unit 200 and the second portions thereof respectively may be connected to corresponding links of a link assembly 420, 430, and 440, which constitute the hinge unit 400, as shown in FIG. 2.

FIG. 2 illustrates a hinge structure to which leg frames and actuators are coupled, wherein two left or right actuators 330 and 340, leg frames 311 and 312, and a link assembly 420, 430, and 440 are hinge-connected to one another.

One end of the front actuator 330 is connected to the connection frame 220 of the mechanism unit 200 and the other end of the front actuator 330 is connected to a first link 420 of the link assembly. One end of the rear actuator 340 is connected to the rear leg frame 312 and the other end of the rear actuator 340 is connected to a second link 430 of the link assembly.

The front actuator 330 of the driving unit 300 is connected to the connection frame 220 of the mechanism unit 200 to remain substantially parallel to the ground or perpendicular to the vertical frame 210 of the mechanism unit 200.

A portion of the first link 420 which is located opposite to a portion connected to the front actuator 330 is hinge-connected to the connection frame 220 of the mechanism unit 200 through the pivot shaft 410. The first link 420 includes a guiding member at its center, which restricts a motion of the second and third links 430 and 440 in a predetermined direction.

The second link 430 is connected to the rear leg frame 312 and the rear actuator 340, and one end of the second link 430 is connected to a sliding member 450 that may perform both rotational and rectilinear motions. Only the rectilinear motion in the directions of arrows may be possible by the guiding member and sliding member 450 of the first link 420 while motions in the other directions are restricted.

The third link 440 is connected to the front leg frame 311 and the sliding member 450.

As the rear actuator 340 is activated so that its length is changed, the second link 430 connected to the rear actuator 340 also changes its position and travels in the arrow direction by the guiding member and the sliding member 450. Likewise, the third link 440 also changes its position by the guiding member and the sliding member 450 so that the rear leg frame 312 connected to the second link 430 and the front leg frame 311 connected to the third link 440 begin to rotate. For example, an angle d2 between the front leg frame 311 and the rear leg frame 312 varies.

As the front actuator 330 is activated to change its length, the first link 420 starts to rotate with respect to the pivot shaft 410 and the sliding member 450 whose motion is restricted by the guiding member travels correspondingly. Further, the second link 430, the third link, and the leg frames 311 and 312 connected to the sliding member 450 are moved, and the angle d1 is thus changed.

However, since the wheels 321 and 322 respectively connected to the leg frames 311 and 312 remain stationary without rotation, the mechanism unit 200 to which the front actuator 330 is attached rotates instead of the first link 420 rotating, and the angle of the arm stand 120 of the manipulation unit 100 is varied accordingly.

The four wheels 321 and 322 are respectively connected to the corresponding leg frames 311 and 312 through steering shafts so that the travelling directions may be changed. The travelling directions of the front wheels 321 may be controlled by steering motors 325 provided at the steering shafts.

The front wheels 321 are integrally provided with driving motors (for example, in-wheel motors) to allow a user to smoothly walk with a little force. Further, the driving motors and/or steering motors 325 may be adjusted so that the walking-assistant device does not slide down on an inclined ground.

The rear wheels 322 may be configured to move by the corresponding steering shafts in all directions within a predetermined angle range—for example, the rear wheels 322 may be "omni-wheels", and so that a brake is exerted to the rear wheels 322 upon departing from a predetermined range.

Further, a locking unit 327 is attached to the wheel unit 320 to lock the wheels not to move. According to embodiments, the locking unit 327 may be attached to all of the wheels, the front wheels 321 only, or the rear wheels 322 only.

According to an embodiment, one or more sensors (not shown) may be provided at a front side of the walking-assistant device, for example, before the connection frames 220 or the front support 230 to detect an obstacle.

Hereinafter, a mechanism which allows a user to perform a motion, such as moving, sitting, or standing, using a walking-assistant device according to an embodiment will be described.

Figure 3A:
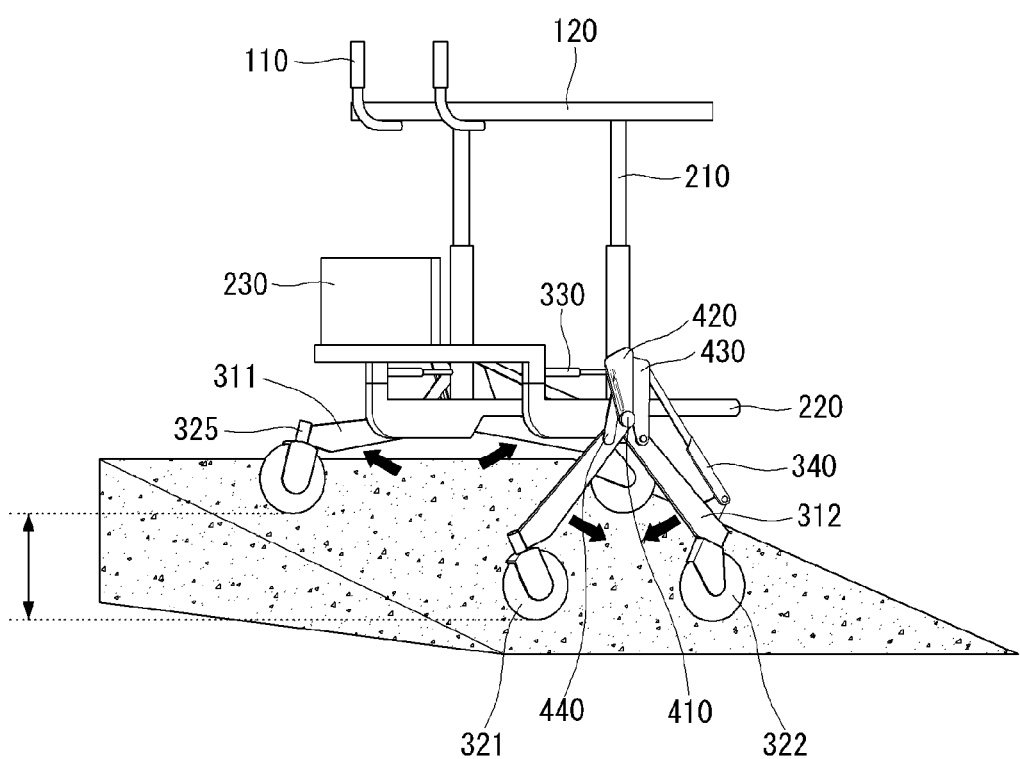
FIGS. 3A and 3B are views for describing a moving mechanism for assisting in a user's walking when the user moves on an uneven ground, such as an inclined ground or bank.
Figure 3B:
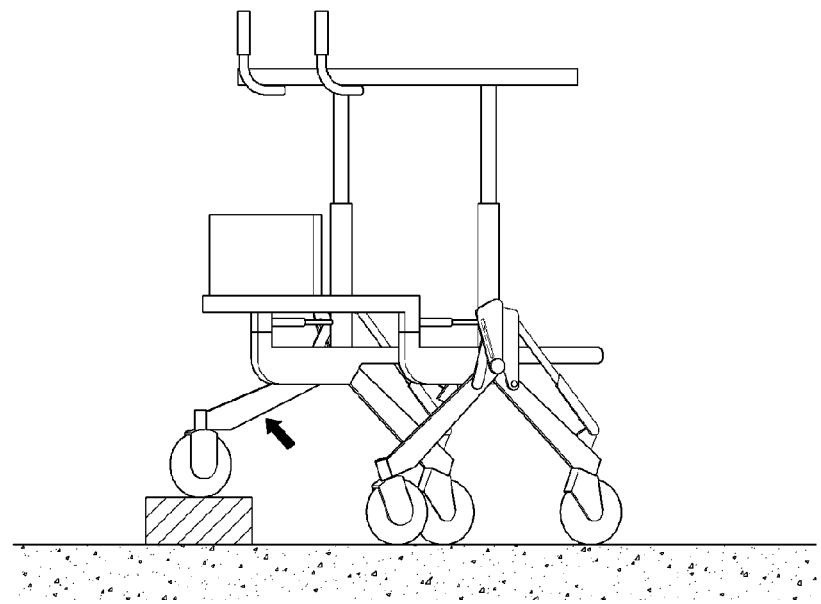

FIGS. 3A and 3B are views for describing a moving mechanism for assisting in a user's walking when the user moves on an uneven ground, such as an inclined ground or a ground having a hubble.

A moving mechanism includes the mechanism unit 200 and the driving unit 300 for assisting in a user walking on an uneven ground, such as an inclined ground or a ground having a hubble. As shown in FIGS. 3A and 3B, the moving mechanism obtains four degrees of freedom from the four linear actuators 330 and 340 of the driving unit 300, wherein three degrees of freedom enable control of postures of three degrees of freedom on a flat ground and inclined grounds that have been inclined in front and rear directions and in left and right directions, and the one remaining degree of freedom helps to walk beyond a hubble so that a user may take a stable walk.

When walking on a flat ground, the user may easily travel in a desired direction with a bit amount of force using the rear wheels 322 that are positioned at a rear side of the driving unit 300 and move in the whole directions, thereby maximizing user's mobility and convenience.

Upon walking on an inclined ground, the walking-assistant device may separately control the pair of front actuators and the pair of rear actuators, may separately control the pair of left actuators and the pair of right actuators, or may independently control the four actuators so that the arm stand 120 of the manipulation unit 100 may remain parallel to the flat ground even if the four wheels 321 and 322 have different heights.

Further, to prevent the wheels from sliding on an inclined ground, the rear wheels 322 may be moved only within a predetermined angle range so that a brake is exerted to the wheels when departing from the range.

Upon detecting a slope while walking on a road, the walking-assistant device may produce a proper amount of rotational force to the front wheels 321 or adjust the steering motors 325 provided at the steering shafts of the front wheels 321 to change the travelling directions of the wheels 321. By doing so, the user may take a smooth and safe walk with a little amount of power.

Figure 4:
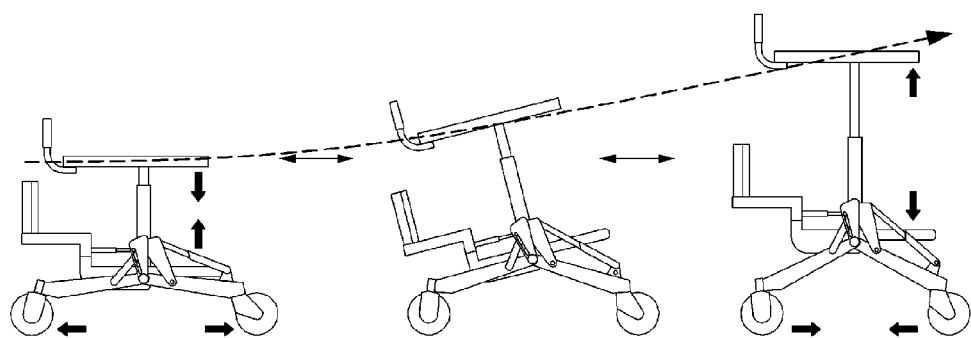
FIG. 4 is a view for describing a sitting/standing-assistant mechanism for supporting a user's sitting and standing operation.

FIG. 4 illustrates a sitting/standing-assistant mechanism for supporting a user's sitting and standing operation.

The sitting/standing-assistant mechanism adjusts its height using the two vertical frames 210 of the mechanism unit 200 and adjusts an effective support surface with respect to a ground using the four linear actuators 330 and 340.

When the user attempt to sit down, the mechanism detects the user's center of weight down and correspondingly controls the vertical frames 210 to reduce height of the mechanism unit 200. At this time, the user's center of weight may experience a sharp change, and may thus depart from an effective area of the walking-assistant device, thereby causing the user or device to fall down. To prevent this, all or some of the actuators 330 and 340 are adjusted to expand distances between the wheels, thereby broadening the effective support area of the ground. By doing so, the user may lower his center of weight while supporting his weight without falling down.

Further, while the vertical frames 210 of the mechanism unit 200 are controlled to lower the height of the mechanism unit 200, the front actuators 330 of the driving unit 300 are controlled so that the arm stand 120 of the manipulation unit 100 tilts forward. This is why the user's center of weight remains close to the center of weight of the walking-assistant device while the user leaning against the arm stand 120 lowers his center of weight.

On the other hand, when the user attempts to stand up, the mechanism detects the user's center of weight up and accordingly controls the vertical frames 210 to raise height of the mechanism unit 200 and adjusts all or some of the actuators 330 and 340 of the driving unit 300 to bring the wheels close to one another so that the user's center of weight becomes close to the center of weight of the walking-assistant device. By doing so, it may be possible to narrow the effective support area of the ground for supporting the user's weight.

To ensure the user's safety, the sitting/standing-assistant mechanism may include an automatic wheel braking mechanism that brakes the wheels of the driving unit 300 to protect the user from a variation in effective support area of the ground created when the user carries out sitting and standing. For example, when the user tries to sit so that the distances between the wheels increase to expand the effective area, the mechanism operates to put on a brake to the front wheels 321 to prevent the walking-assistant device from sliding away and for the user to be seated with a stable pose.

Further, based on the user's posture information obtained by measuring acceleration upon user's sitting/standing and on the information on a force sensed by the sensors in the arm stand 120, a user movement profile for the user's sitting and standing may be created that allows the vertical frames 210 and the actuators 330 and 340 to be controlled to help the user to conveniently stand and sit while supporting the user's upper body.

Figure 5:
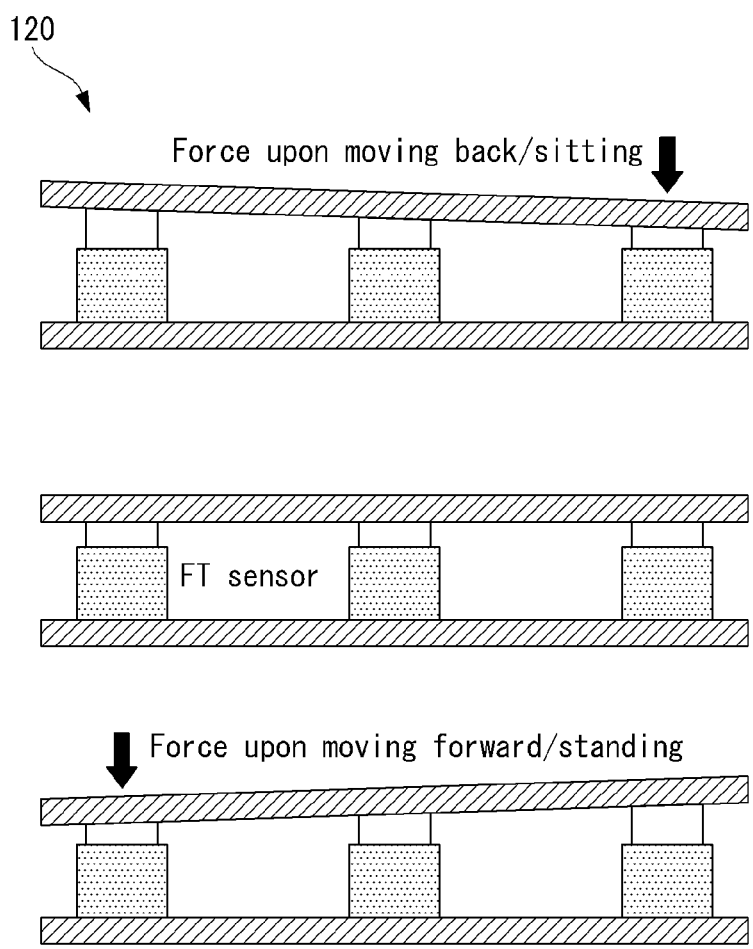
FIG. 5 is a view for describing a user's moving intention using a plurality of sensors.

FIG. 5 illustrates detecting a user's operation intention using a plurality of sensors provided in the arm stand 120.

The arm stand 120 includes a plurality of sensors, for example, six-axial FT sensors, to detect a force exerted from above so as to grasp a user's operation intention, such as sitting/standing.

As shown in FIG. 5, when the user attempts to move forward, a force is concentrated on a front portion of the arm stand 120 so that among two or more FT sensors provided under a surface of or inside the arm stand 120 (for example, with respect to a portion which only one arm contacts), a sensor positioned at a front side (also referred to as "front sensor") outputs a higher value than a sensor positioned at a rear side (also referred to as "rear sensor") does.

When the user attempts to move left, a force is concentrated on a left portion of the arm stand 120, a sensor positioned at a left side (also referred to as "left sensor") outputs a higher value than a sensor positioned at a right side (also referred to as "right sensor") does. As such, the user's operation intention may be detected by the plurality of sensors in the arm stand 120.

The user's intention to sit and stand may also be detected by the similar method using the plurality of sensors, thus providing stable sitting/standing support.

Further, to ensure the user's safety in walking, a degree of twist of the driving unit 300 may be also detected on an uneven ground, such as an inclined ground or bank, so that the support surface of the arm stand 120 may always remain perpendicular to the direction of gravity. This enables such an effect as the user walks on a flat ground.

Upon detection of an output in excess of a predetermined value from the sensors, the actuators and the motors are controlled to maintain a stable posture and to prevent the user from falling down.

Hereinafter, the manipulation unit 100 will be described in further detail, which plays a role to control the walking-assistant device by detecting a user's intention to manipulate the walking-assistant device.

Figure 6:
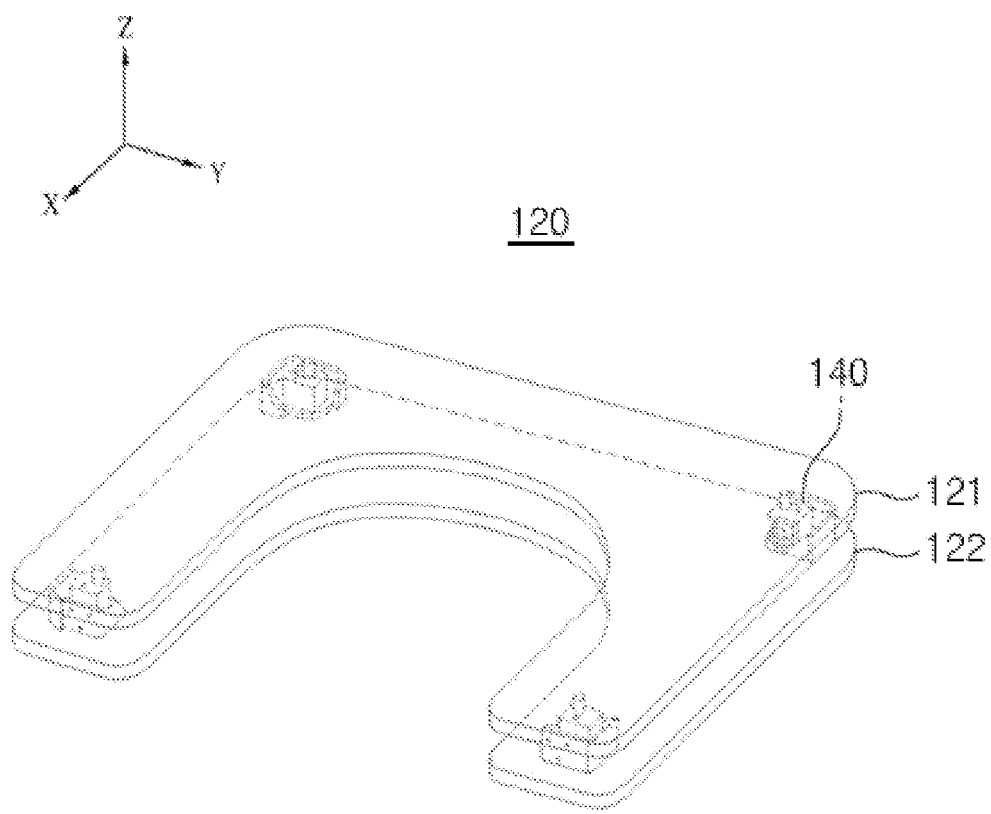
FIG. 6 is a perspective view illustrating an arm stand (compliance controller) that functions as a controller of a walking-assistant device according to an embodiment of this document.

FIG. 6 is a perspective view illustrating the arm stand 120 (also referred to as "compliance controller 120") functioning as a controller in a walking-assistant device according to an embodiment of this document.

As shown in FIG. 6, the arm stand 120 includes an upper frame 121 on which a user may rest his arms, a lower frame 122 connected to the upper frame 121 under the upper frame 121, and a plurality of sensors 140 between the upper and lower frames 121 and 122.

According to an embodiment, the upper frame 121 may have the same or substantially the same shape as the lower frame 122. The upper and lower frames 121 and 122 each may be configured to have a "U" shape.

The sensors 140 measure a force exerted to the upper frame 121 by the user to detect the user's moving intention.

If the user exerts a force to the upper frame 121 to drive the walking-assistant device, the force is transferred to the sensors 140 that in turn generate a signal corresponding to the force. Based on the signal, the user's moving intention may be detected. For example, the user's intention to manipulate the walking-assistant device may be grasped through the sensors 140.

Specifically, when the user exerts a force to a front portion of the upper frame 121, this may be considered as the user having a moving intention to move the walking-assistant device forward, and when the user exerts a force to a left portion of the upper frame 121, this may be considered as the user having a moving intention to move the walking-assistant device leftward.

The sensor 140 may measure a force exerted to the upper plate 121 as a three axial force. For example, since the user's force may be measured as an X, Y, and Z axial force, the sensor 140 may measure the user's three axial force and the manipulation unit 100 may activate the walking-assistant device by determining the user's moving intention based on the measured three axial force.

The sensor 140 is positioned between the upper frame 121 and the lower frame 122. As shown in FIG. 6, four sensors 140 may be located at four corners of the upper and lower frames 121 and 122 to effectively measure the user's force. However, the number or location of the sensors 140 is not limited thereto.

The sensor 140 will be described in further detail below with reference to FIG. 7.

Figure 7:
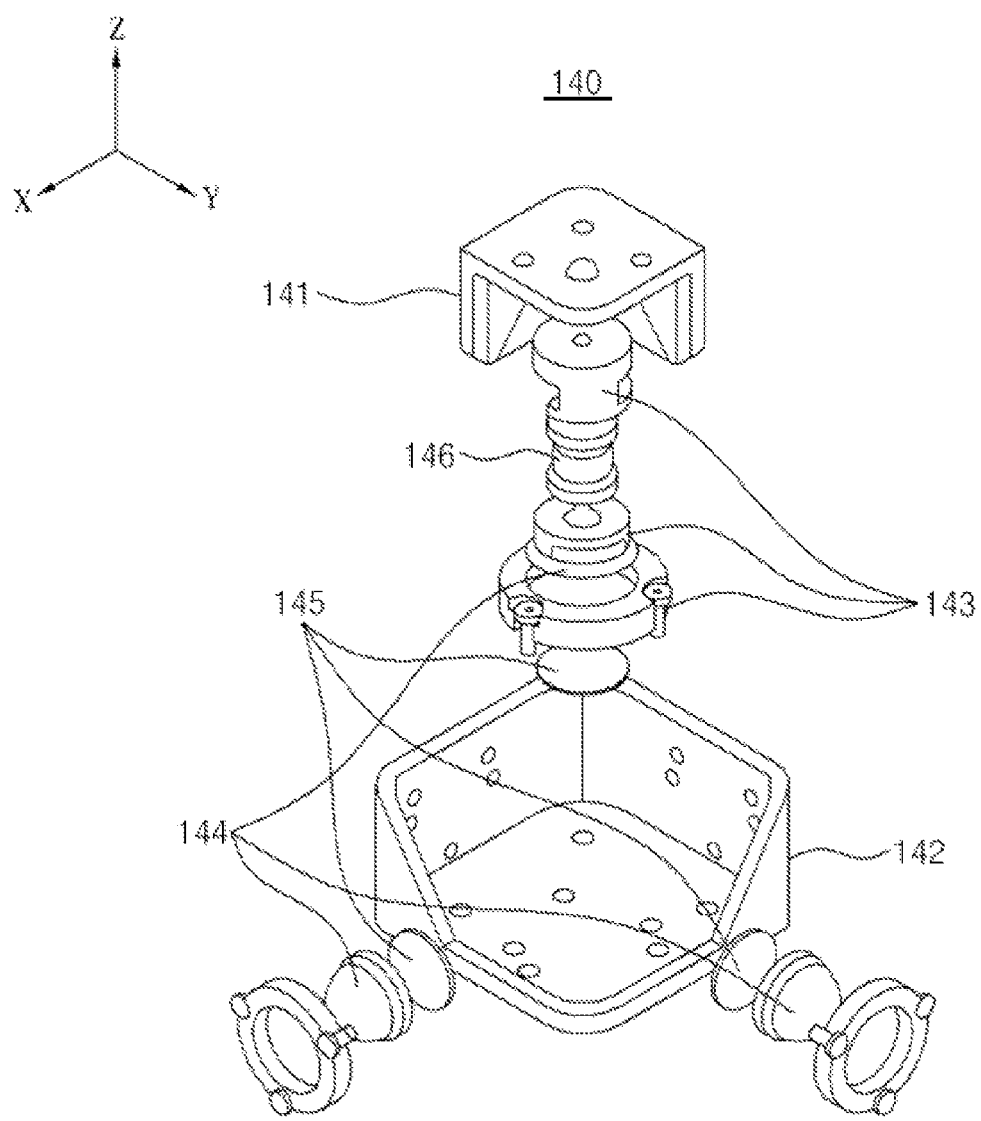
FIG. 7 is an exploded view illustrating a sensor according to an embodiment of this document.
Figure 8:
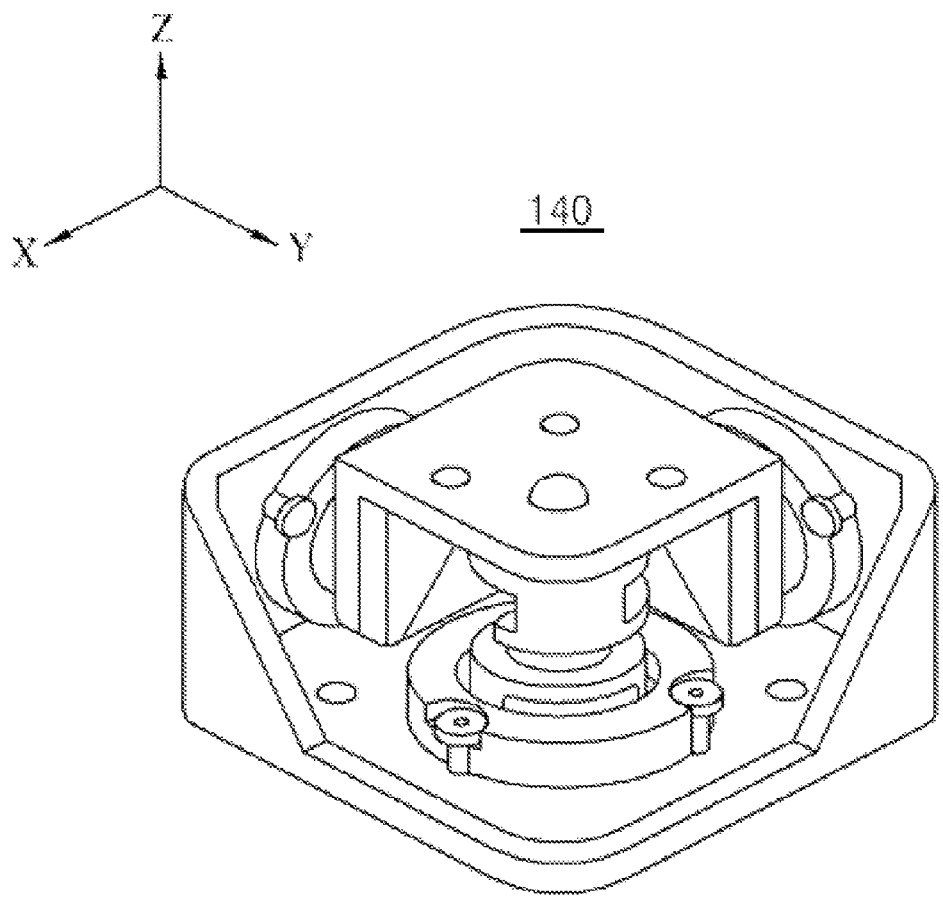
FIG. 8 is a perspective view illustrating an assembled sensor according to an embodiment of this document.

FIG. 7 is an exploded view of a sensor 140 according to an embodiment of this document, and FIG. 8 is a perspective view of a sensor 140 according to an embodiment of this document.

Referring to FIG. 7, the sensor 140 includes a lower fixing member 142 attached to the lower frame 122, three compression sensing members 145 positioned on three surfaces of the lower fixing member 142 in X, Y, and Z directions, three rubber members 144 respectively contacting the compression sensing members 145 thereon, fixing frames 143 fixing the respective rubber members 144, a vertical rubber member 146 positioned in Z direction to provide mobility in response to a user's movement and transferring the user's force to the compression sensing members 145, and an upper fixing member 141 coupled with the upper frame 121 and the vertical rubber member 146. The upper fixing member 141 may be moved according to the user's movement.

The compression sensing member 145 converts a compression force exerted thereto into a predetermined compression signal.

The rubber member 144 and the vertical rubber member 146 are located between the compression sensing member 145 and the upper fixing member 141 or between the compression sensor 145 and the lower fixing member 142. The rubber member 144 and the vertical rubber member 146 may be formed of a rubber material that has high hardness to minimize ductile characteristics.

As such, the sensor 140 includes the upper fixing member 141, the lower fixing member 142, the three compression sensing members 145, and the rubber members 144 contacting the compression sensing members 145, and thus, the user's force exerted to the upper frame 121 is transferred to the upper fixing member 141. The user's force transferred to the upper fixing member 141 renders the rubber members 144 to pressurize the compression sensing members 145 and is thereby transformed into a compression force that is in turn transferred to the three compression sensing members 145 attached to the lower fixing member 142. The three compression sensing members 145 measure the user's force with respect to three axes, such as X, Y, and Z axes, to produce a signal necessary to grasp the user's intention to manipulate the walking-assistant device.

The sensor 140 is configured so that the three compression sensing members 145 are attached to inner portions of the lower fixing member 142. Accordingly, three axial forces may be measured by obtaining the direction and magnitude of the user's force based on the compression force transferred from the upper fixing member 141 movable in response to the user's movement to the compression sensing members 145.

According to an embodiment, a predetermined space or a spring may be disposed between the compression sensing member 145 and the rubber member 144 or between the compression sensing member 145 and the vertical rubber member 146 to prevent the sensor 140 from erroneously determining a force not originating from the user as the user's moving intention. For example, the space or spring may prevent the compression sensing members 145 from being pressurized or may prevent the upper frame 121 from being slightly bent due to the user's force thus pressurizing the compression sensing members 145.

Figure 9:
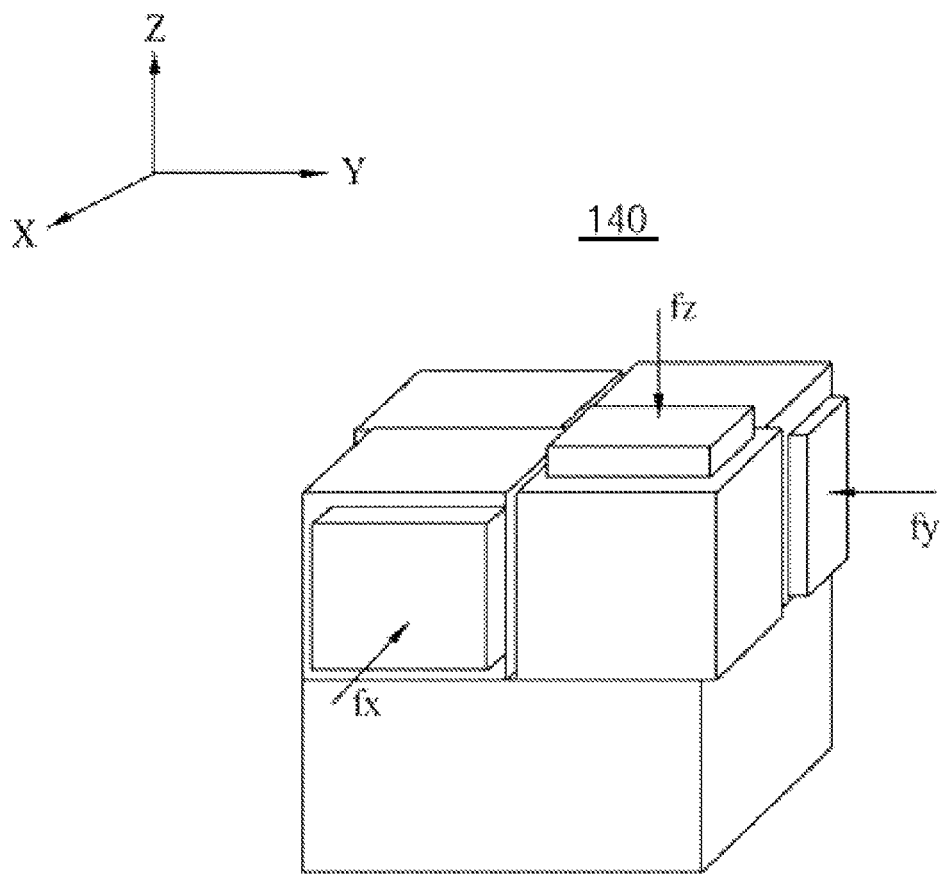
FIG. 9 is a conceptual view illustrating a sensor according to another embodiment of this document.

FIG. 9 illustrates a sensor 140 according to an embodiment of this document.

The sensor 140 includes a lower fixing member 142 and three compression sensing members 145 attached to outer portions of the lower fixing member 142.

By the above configuration, the sensor 140 receives a user's force through a rubber member attached to the upper frame 121. Specifically, rubber members movable in response to the user's movement are attached to the upper frame 121 and contact the three compression sensing members 145 attached to outer portions of the lower fixing member 142. The rubber members transfer the user's force to the three compression sensing members 145 that may in turn separate the user's force into three axial forces and may measure the three axial forces.

The rubber member is positioned between the compression sensing unit 145 and the upper frame 121. The rubber member may be formed of a rubber material having high hardness to minimize ductile characteristics.

As such, the sensor 140 described in connection with FIGS. 7 and 8 has the three compression sensing members 145 attached to the inner portions of the lower fixing member 142, and the sensor 140 described in connection with FIG. 9 has the three compression sensing members 145 attached to the outer portions of the lower fixing member 142.

The user's force is transferred from the upper fixing member 141 to the compression sensing members 145 in the sensor 140 described in connection with FIGS. 7 and 8, and the user's force is transferred from the rubber members attached to the upper frame 121 to the compression sensing members 145 attached on the outer portions of the lower fixing member 142 in the sensor 140 described in connection with FIG. 9.

Because of using the three compression sensing members 145, the sensor 140 may exhibit a rapid response to the user's force with less danger of a malfunction, thus allowing the user's moving intention to be correctly determined.

The compression sensing member 145 may be implemented using a sensor commonly used, thus saving manufacturing costs. Further, the sensor 140 may be manufactured with small and compact sensors, thus making the walking-assistant device smaller.

Hereinafter, a method of determining a user's moving intention based on a signal detected by the sensor 140 will be described.

Figure 10:
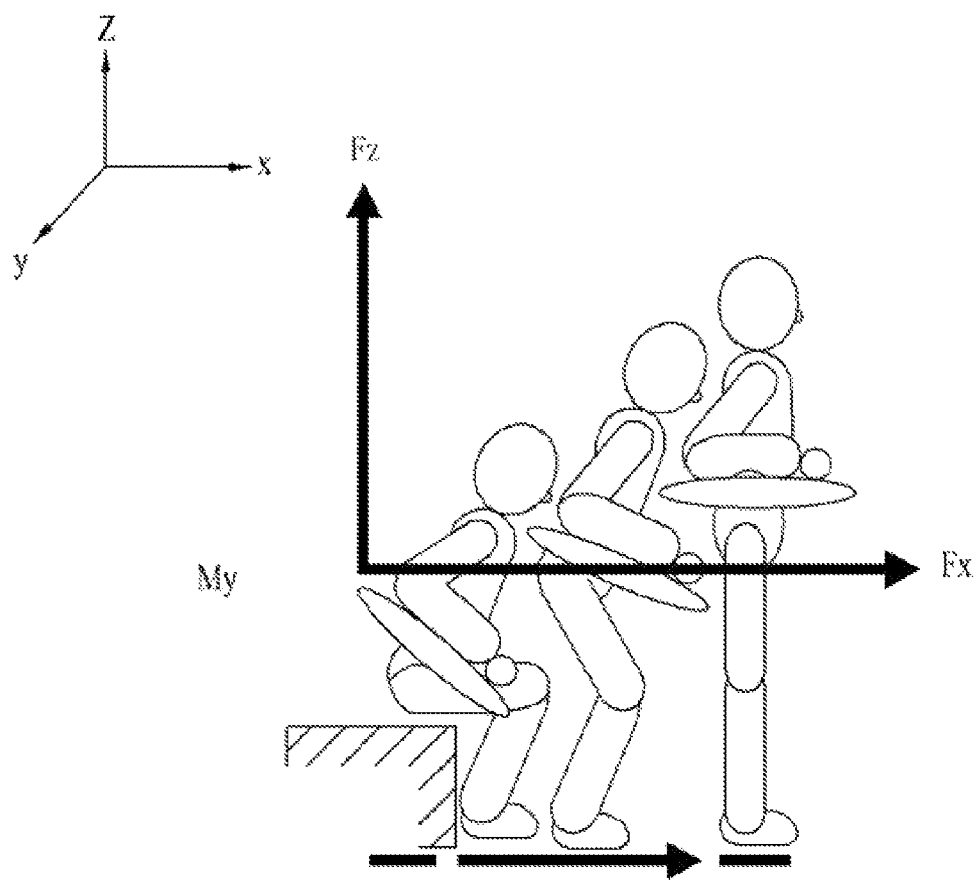
FIG. 10 is a view for describing forces exerted when a user performs a sitting/standing motion using a walking-assistant device according to an embodiment of this document.

FIG. 10 illustrates forces exerted when a user takes sitting/standing motions using a walking-assistant device having an arm stand 120 (or compliance controller) according to an embodiment of this document.

Four or more sensors 140 are provided at corners of the arm stand 120 of the manipulation unit 100 as shown in FIG. 6.

For convenience of description, the arm stand 120 is assumed to have four sensors 140.

For example, the sensor 140 positioned at a front and left portion of the arm stand 120 is referred to as a first sensor, the sensor 140 positioned at a rear and left portion of the arm stand 120 is referred to as a second sensor, the sensor 140 positioned at a rear and right portion of the arm stand 120 is referred to as a third sensor, and the sensor 140 positioned at a front and right portion of the arm stand 120 is referred to as a fourth sensor. A distance between left and right sensors is referred to as "Ly", and a distance between front and rear sensors is referred to as "Lx".

The arm stand 120 may operate with a control system (not shown) that combines and analyzes signals output from the compression sensing members 145 of the four sensors 140 to grasp a user's moving intention.

The control system may combine and analyze signals output from the compression sensing members 145 of the four sensors 140 to represent the user's force as six axial forces and moments. The six axial forces and moments refer to forces in X, Y, and Z directions and moments in X, Y, and Z directions that may be represented as in Equations 1 and 2:

$$Fx=(f1x-f2x)-(f3x-f4x)$$

$$Fy=(f2y-f3y)-(f4y-f1y)$$

$$Fz=-(f1z+f2z+f3z+f4z) \qquad \text{[Equation 1]}$$

$$Mx=[(f1z+f2z)-(f3z+f4z)]*Ly$$

$$My=[(f2z+f3z)-(f4z+f1z)]*Lx$$

$$Mz=[(f1x-f2x)+(f3x-f4x)]*Ly+[(f2y-f3y)+(f4y-f1y)]*Lx \qquad \text{[Equation 2]}$$

By analyzing the six axial forces and moments, the control system may grasp the user's moving intention.

As an example, when the user exerts a force to the arm stand 120 to move the walking-assistant device forward, the first and fourth sensors shown in FIG. 6 are activated such that the upper fixing members 141 attached to the upper frames 121 are pushed forward to pressurize the compression sensing members 145 positioned in X direction, thereby producing a compression signal. Meanwhile, the second and third sensors located opposite to the first and fourth sensors do not respond to the user's force.

On the contrary, when the user exerts a force to the arm stand 120 to move the walking-assistant device back, the second and third sensors respond to the user's force but the first and fourth sensors don't.

This can be also seen from Equation 1 wherein Fx couples an X directional force of the first sensor with an X directional force of the fourth sensor and couples an X directional force of the second sensor with an X directional force of the third sensor.

Accordingly, as shown in FIG. 6, upon detecting a user's force exerted to the arm stand 120, when a large force Fx appears in X direction, the control system may determine it as the user attempting to move forth and back the walking-assistant device, and when a large force Fy appears in Y direction, the control system may determine it as the user attempting to move the walking-assistant device left and right. Further, when a large moment Mz is exerted in Z direction, the control system may deem it as the user taking a rotational motion.

When the user takes a sitting or standing motion as shown in FIG. 10, large X and Z directional forces Fx and Fz and a large Y directional moment My are measured with respect to the arm stand 120.

When determining that the user attempts to sit or stand from the fact that large X and Z directional forces Fx and Fz and a large Y directional moment My are measured, the control system activates the walking-assistant device to further increase the X and Z directional forces Fx and Fz and the Y directional moment My, so that the user facilitates to take the sitting/standing motion.

Further, the control system may store information on user's forces exerted when the user uses the walking-assistant device in his daily life. Based on the stored information, the control system may disregard a force exerted to excessively depart from the information stored therein.

As such, the embodiments of this document may determine a user's moving intention based on a signal measured by the arm stand 120 of the walking-assistant device to control the walking-assistant device, thus ensuring the user's safety in walking.

The embodiments of this document have been explained above with reference to exemplary embodiments. It will be evident to those skilled in the art that various modifications may be made thereto without departing from the broader spirit and scope of the embodiments. Further, although the embodiments have been described in the context its implementation in particular environments and for particular applications, those skilled in the art will recognize that this document's usefulness is not limited thereto and that the embodiments can be beneficially utilized in any number of environments and implementations. The foregoing description and drawings are, accordingly, to be regarded in an illustrative rather than a restrictive sense.

What is claimed is:

1. A walking-assistant device comprising:
   a driving unit including four wheels and four actuators for adjusting heights of the four wheels;
   a mechanism unit including two vertical frames whose length is adjusted and connection frames for fixing and connecting the vertical frames; and
   a manipulation unit for including a plurality of sensors for measuring applied pressure and for controlling the driving unit and the mechanism unit based on a signal detected by the sensors,
   wherein the four wheels of the driving unit are connected to the mechanism unit through two left leg frames and two right leg frames that are hinge-connected to the mechanism unit through pivot shafts, and
   wherein two front wheels of the four wheels are activated by motors for rotation and connected to respective corresponding leg frames through shafts having steering motors for adjusting directions, and two rear wheels of the four wheels are connected to respective corresponding leg frames through steering shafts to move freely within a predetermined angle range.

2. The walking-assistant device of claim 1, wherein two actuators of the four actuators are hinge-connected to respective corresponding leg frames and the other two actuators of the four actuators are hinge-connected to the mechanism unit.

3. The walking-assistant device of claim 1, further comprising:
   a link assembly for changing a horizontal angle of the manipulation unit or an angle between the front leg frames and the rear leg frames by changing lengths of the actuators,
   wherein the link assembly includes a first link, a second link, and a third link,
   wherein a first portion of the first link is connected to a front actuator of the actuators and a second portion of the first link is connected to the mechanism unit through the pivot shaft,
   wherein the second link is connected to a rear actuator of the actuators and a corresponding rear leg frame,
   wherein the third link is connected to a corresponding front leg frame, and
   wherein the second and third links are connected to a sliding member that is guided by a guiding member provided at a central portion of the first link.

4. The walking-assistant device of claim 1, further comprising:
   a sensor that detects an obstacle in a travelling direction.

5. The walking-assistant device of claim 1, wherein upon measuring first (or second) patterned signals from the plurality of sensors, the manipulation unit controls the vertical frames to decrease (or increase) a height of an arm stand and controls the actuators to increase (or decrease) an angle between the front leg frames and the rear leg frames while the height of the arm stand decreases (or increases).

6. The walking-assistant device of claim 5, wherein the manipulation unit controls the motors moving the front wheels while the height of the arm stand decreases to stop the front wheels from rotating.

7. The walking-assistant device of claim 5, wherein the manipulation unit controls the actuators so that the arm stand tilts forward while the height of the arm stand decreases or increases.

8. The walking-assistant device of claim 1, wherein the manipulation unit comprises an upper frame, a lower frame under the upper frame, and the plurality of sensors between the upper and lower frames,
   wherein each of the sensors includes a lower fixing member attached to the lower frame, a plurality of compression sensing members attached to a surface of the lower fixing member, a plurality of rubber members contacting the respective compression sensing members, a vertical rubber member which is movable to transfer pressure in a vertical direction to the compression sensing members, and a upper fixing member attached to the upper frame to be connected to the vertical rubber member.

9. The walking-assistant device of claim 8, wherein the sensors respectively include a fixing frame to fix the rubber members.

10. The walking-assistant device of claim 8, wherein the sensors are attached on an inner surface or an outer surface of the lower fixing member.

11. The walking-assistant device of claim 10, wherein the sensors respectively include outer rubber members that are attached to a surface of the upper frame under the upper frame to move in response to applied pressure and in contact with the compression sensing members attached on the outer surface of the lower fixing member.

12. The walking-assistant device of claim 8, wherein a space having a predetermined distance or a spring having a predetermined length is disposed between a corresponding compression sensing members and a corresponding rubber member.

13. The walking-assistant device of claim 8, wherein the compression sensing members each produce a signal based on a compression force exerted from a contact with a corresponding rubber member.

* * * * *